United States Patent
Schmidt, Jr. et al.

(10) Patent No.: US 7,349,528 B2
(45) Date of Patent: *Mar. 25, 2008

(54) UNIFIED MESSAGING SYSTEM

(75) Inventors: Albert L. Schmidt, Jr., Hopkinton, MA (US); Vittorio Bucchieri, Wakefield, MA (US); Robert A. Virzi, Wayland, MA (US)

(73) Assignee: Verizon Laboratories Inc., Waltham, MA (US)

( * ) Notice: Subject to any disclaimer, the term of this patent is extended or adjusted under 35 U.S.C. 154(b) by 37 days.

This patent is subject to a terminal disclaimer.

(21) Appl. No.: 10/801,106

(22) Filed: Mar. 15, 2004

(65) Prior Publication Data

US 2005/0018819 A1 Jan. 27, 2005

Related U.S. Application Data

(63) Continuation of application No. 09/507,830, filed on Feb. 22, 2000, now Pat. No. 6,778,642.

(60) Provisional application No. 60/125,746, filed on Mar. 23, 1999.

(51) Int. Cl.
*H04M 1/64* (2006.01)
(52) U.S. Cl. .............................. 379/88.13; 379/88.17; 379/88.25; 455/419
(58) Field of Classification Search ........... 379/265.09, 379/88.13, 88.14, 76, 88.17, 88.18, 88.22, 379/88.25; 370/352; 455/419
See application file for complete search history.

(56) References Cited

U.S. PATENT DOCUMENTS

| | | | | | |
|---|---|---|---|---|---|
| 5,568,540 | A | * | 10/1996 | Greco et al. | 379/88.25 |
| 5,608,786 | A | * | 3/1997 | Gordon | 370/352 |
| 5,651,054 | A | | 7/1997 | Dunn et al. | 379/67 |
| 5,652,789 | A | | 7/1997 | Miner et al. | 379/201 |
| 5,742,905 | A | | 4/1998 | Pepe et al. | 455/461 |
| 5,870,549 | A | | 2/1999 | Bobo, II | 395/200.36 |
| 5,946,386 | A | * | 8/1999 | Rogers et al. | 379/265.09 |
| 6,108,534 | A | * | 8/2000 | Bourgeois et al. | 455/419 |
| 6,233,318 | B1 | | 5/2001 | Picard et al. | 379/88.17 |
| 6,301,245 | B1 | | 10/2001 | Luzeski et al. | 370/352 |
| 6,411,684 | B1 | * | 6/2002 | Cohn et al. | 379/88.14 |

* cited by examiner

*Primary Examiner*—Gerald Gauthier

(57) ABSTRACT

Methods and systems consistent with the present invention provide a unified messaging system. The unified messaging system comprises a unified messaging system server and clients, such as personal computers, telephones, facsimile machines, and two-way paging machines connected via both land based and wireless connections. This system enables a user to access and retrieve a variety of messages, including voice mail messages, facsimiles, and electronic mail messages via a unified user interface that clearly distinguishes each message type using message identifiers, and segregates messages by type.

5 Claims, 10 Drawing Sheets

UNIFIED MESSAGING SYSTEM

This is a continuation of application Ser. No. 09/507,830, filed Feb. 22, 2000 now U.S. Pat. No. 6,778,642, and claims the benefit of U.S. Provisional Application No. 60/125,746, filed Mar. 23, 1999, all of which are incorporated herein by reference.

BACKGROUND OF THE INVENTION

A. Field of the Invention

The present invention relates generally to messaging systems, and more particularly to a system and method for accessing, displaying, and organizing different message types, such as voice, telephone, and facsimile messages.

B. Description of the Prior Art

Our homes and offices now not only have voice mail capable telephones but also have computers capable of receiving email messages and facsimile messages. Traditionally, messages on each of these devices are stored on a separate messaging system. For example, email messages may be stored on an email server, which can be accessed using an email access program on a computer. Similarly, a home or office telephone user may retrieve voice mail messages stored at a central location or on the local answering machine. Finally, a user may also retrieve facsimile messages stored on a fax server using a computer terminal or a facsimile machine.

Also, traditionally these messages are displayed on a terminal where a user may manipulate these messages using a graphic user interface associated with the respective messaging system. For example, a typical email client on a user's computer lets the user access and manipulate email messages stored on the email server. Similarly, a computer program with a corresponding user interface may permit a user to access and manipulate voice or facsimile messages located on a remote server.

While the ability to receive messages from a multiplicity of messaging devices is convenient, in that users can be reached through the various messaging devices, the users have to check each one of the messaging devices to receive their messages. They also have to remember and learn different commands or icons that implement the same functionality on different messaging devices. Similarly, users have to use a differently arranged user interface when accessing their voice mail from a computer terminal as opposed to a telephone via the public telephone network. The need to access different devices and learn different user interfaces causes waste of time and errors on the part of the users while they access their messages.

Some messaging systems may permit a user to receive messages of a different type—voice, email, facsimile—using a single user interface. Thus, a user may be able to access messages of all types from a single computer terminal using a single interface. Such messaging systems conventionally list all messages, regardless of the message type, chronologically.

Studies show, however, that users commit more errors when accessing messages that are arranged chronologically, than when accessing messages that are arranged by message type. This is, perhaps, because the user interface that displays messages of all types concurrently presents a very cluttered view and contributes to errors.

Also, other studies have shown that a particular user may perceive one message type as more important than other message types depending on whether the user is at her home office or at work office. For example, facsimile messages may be more important to a user when the user is at her work office than when the user is at her home office.

In addition these studies have also shown that different types of users—home users, large corporate users, or small business users—may rely on messages of one particular message type more than the other message types. For example, small business and home users may rely more on voice mail messages than on email messages. On the other hand, large corporate users may rely more on email messages than on voice mail messages.

Finally, some users may perceive voice mail messages as more important than email messages or facsimile messages. Similarly, some users may prefer to receive short messages through voice mail and longer messages through email. None of the prior art messaging systems permit users to access and manipulate different types of messages, including voice mail messages, facsimile messages, and email messages using a single user interface that clearly identifies each message by its type and also permits the user to list only messages of one type that correspond to a selected icon.

As a result, a need exists for a system that enables a user to access and retrieve a variety of messages, including voice mail messages, facsimiles, and electronic mail messages via a unified user interface that clearly distinguishes each message type using message identifiers, and segregates messages by type.

SUMMARY OF THE INVENTION

Methods and systems consistent with the present invention provide a unified messaging system. The unified messaging system comprises a unified messaging system server and clients, such as personal computers, telephones, facsimile machines, and two-way paging machines connected via both land based and wireless connections. This system enables a user to access and retrieve a variety of messages, including voice mail messages, facsimiles, and electronic mail messages via a unified user interface that clearly distinguishes each message type using message identifiers, and permits the user to segregate messages by type.

In one implementation consistent with the present invention a method is provided that facilitates unified messaging. A unified messaging system ("UMS") server stores a plurality of messages, where each message may be a voice message, a text message, or an image. The UMS server determines the type of each message, and assigns an identifier to each message based on its message type. Subsequently, the UMS server displays the messages with the assigned identifier for each message. In addition, an interface for the UMS server permits the user to display only messages of a particular type and in a particular order.

In another implementation, a method is provided to modify views in the unified messaging system. In accordance with this method the UMS server stores a plurality of messages, where each message may be a voice message, a text message, or an image. The UMS server displays a view of at least a subset of the messages, such that the view for each message includes information identifying the message and a message type identifier corresponding to the type of message. Upon receiving a signal indicating a selection to view only messages of a particular type, the UMS server modifies the view of the subset of the messages based on the received signal.

In yet another implementation, a method is provided that modifies views in the unified messaging system based on the destination of each message. In accordance with this method, the UMS server stores a plurality of input messages, where each message has a particular destination. Upon receiving a signal indicating a selection to view only messages identifying a particular destination, the UMS server modifies the view of the subset of the input messages based on the received signal.

BRIEF DESCRIPTION OF THE DRAWINGS

The accompanying drawings, which are incorporated in and constitute a part of this specification, illustrate systems and methods consistent with the invention and, together with the description, serve to explain the advantages and principles of the invention.

DETAILED DESCRIPTION

Reference will now be made in detail to an implementation consistent with the present invention as illustrated in the accompanying drawings. Wherever possible, the same reference numbers will be used throughout the drawings and the following description to refer to the same or like parts.

Introduction

Methods and systems consistent with the present invention permit users to access and manipulate messages of various types using a unified messaging system. Users can selectively display messages of only one type. The unified messaging system consists of client terminals and messaging servers that are interconnected using an information network, such as the Internet, and a public telephone network.

Users, once logged on, can access and manipulate various types of messages—voice mail, email, and facsimiles—located on the message servers. In addition to displaying messages of various types chronologically, users can display messages by message type. Moreover, the unified messaging system also displays a status identifier for a message, such as when a message is an urgent message it attaches an urgent identifier to that message. Users can switch to a view of any message type by selecting a unique icon associated with each message type. Finally, the unified messaging system attaches a "new message" identifier to incoming messages and removes the identifier when the message is read.

Information Network Architecture for the Unified Messaging System

Figure 1:
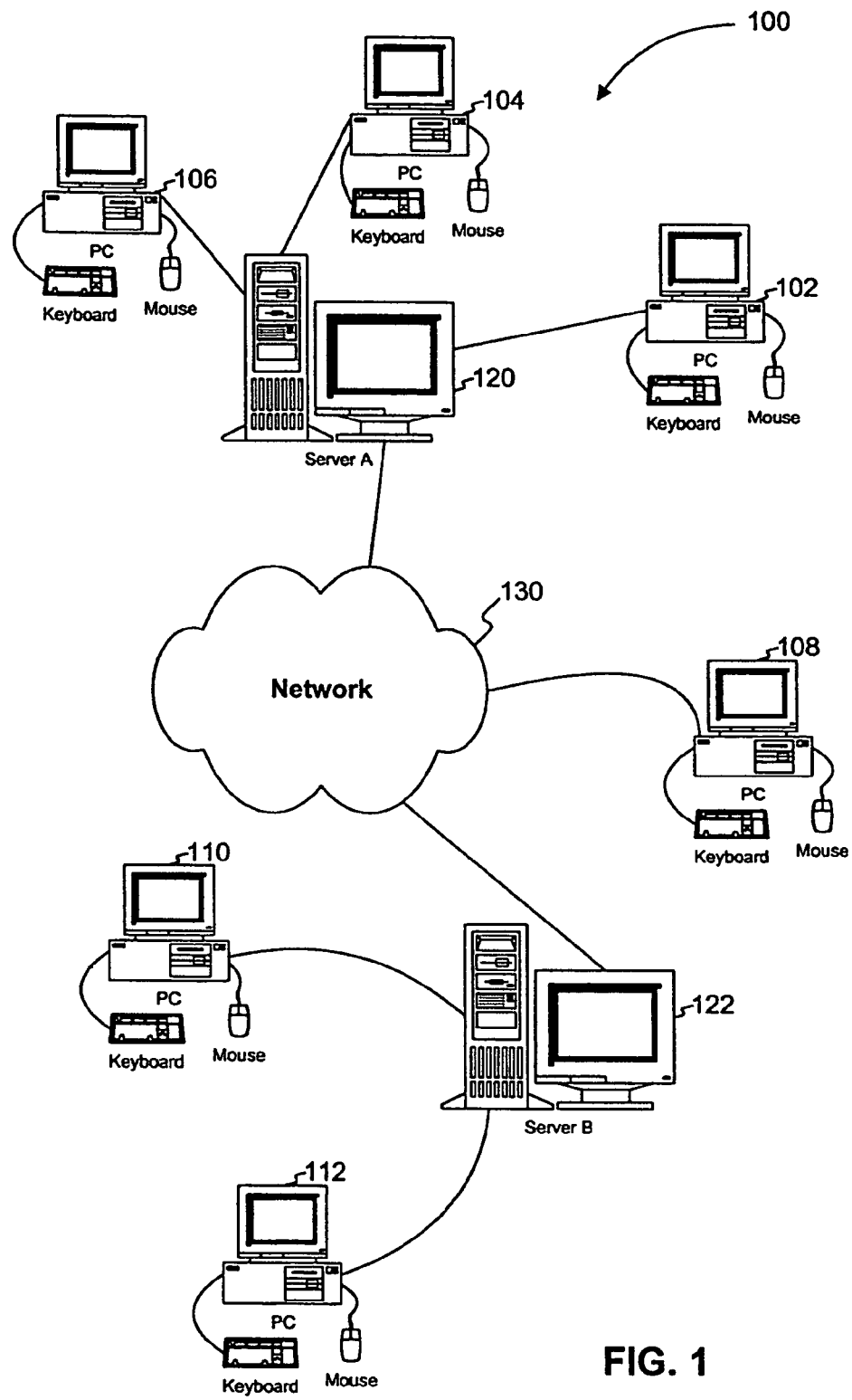
FIG. 1 is a schematic diagram of an information network in which systems consistent with the present invention may be implemented.

FIG. 1 is a schematic-diagram of an information network 100 in which a Unified Messaging System ("UMS") consistent with the principles of the present invention may be implemented. Generally, the information network 100 consists of client workstations (102, 104, 106, 108, 110, and 112) connected to server workstations (120 and 122) through a network 130. The network 130 may be a Local Area Network (LAN), a Wide Area Network (WAN), or the Internet. Accordingly, the network 130 generally has multiple data links connecting individual local area networks forming the global information network 100. Also, the data links linking the local area networks may be either land-based fiber optic cables or wireless links.

Once a client workstation, such as the client workstation 102 is connected to the network 130, it can access any server workstation, such as the Sever B 122 connected to the network 130. Indeed, client workstation 102 may be located in the United States while another client workstation 106 may be located in Sri Lanka and yet both client workstations may access the server workstation Server A 120 located in Spain. Similarly, the server workstations Sever A 120 and Server B 122 need not be located in the same building, or even in the same country.

Figure 2:
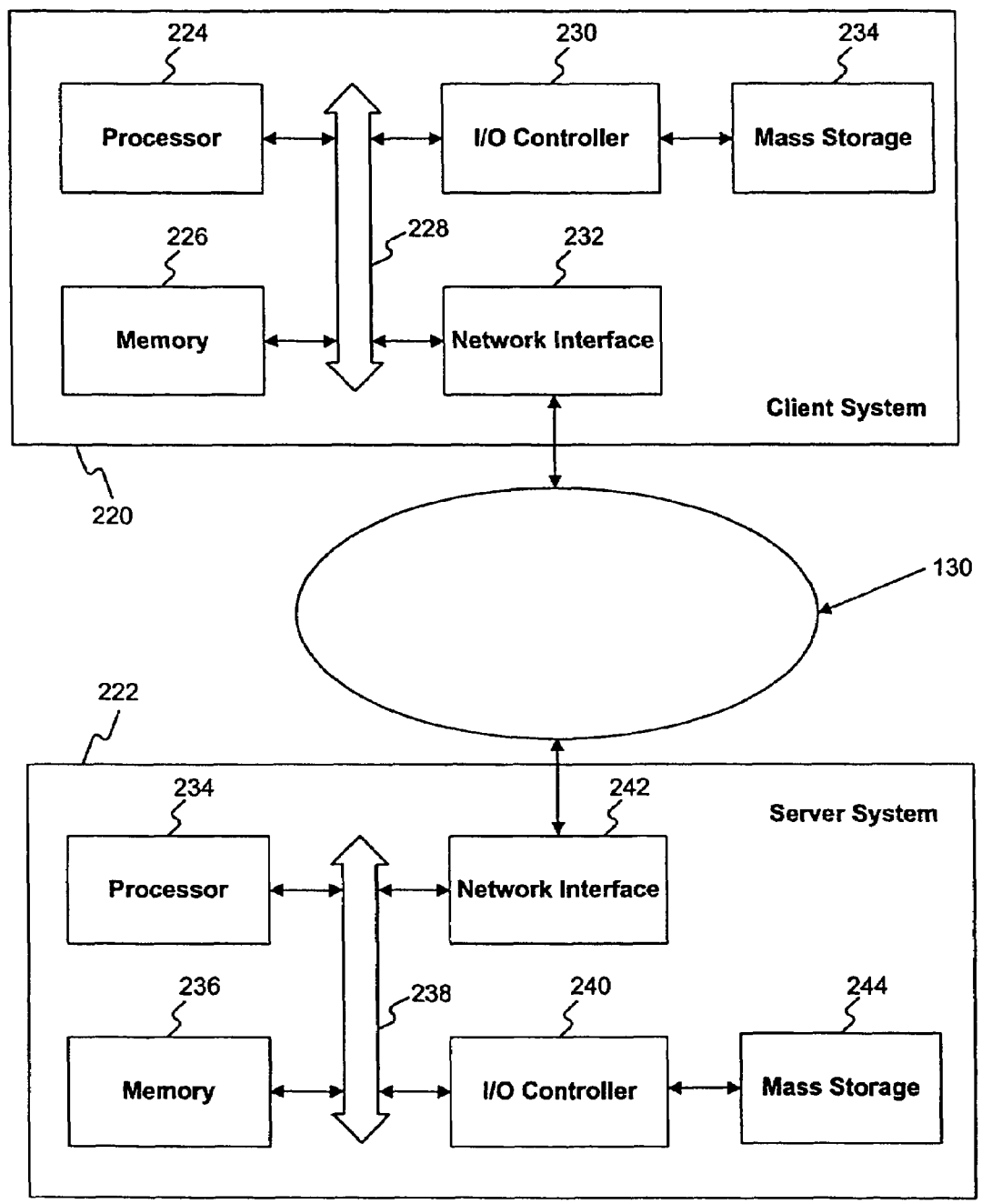
FIG. 2 is a schematic diagram illustrating the interconnection of clients and servers through the information network and the details of a client terminal and a unified messaging server in accordance with the present invention.

FIG. 2 is a block diagram of a client workstation and a server workstation interconnected through a network 130 used in implementations of the present invention. A client workstation 220 is connected to a server workstation 222 via the network 130. The client workstation 220 includes conventional components, such as a processor 224, a memory 226, a bus 228, an I/O controller 230, a network interface 232, and a mass storage 234. The bus 228 provides connectivity and communications among these components. Furthermore, the bus 228 uses a bus protocol, such as Industry Standard Architecture (ISA), Peripheral Component Interconnect (PCI), or Small Computer Systems Interconnect (SCSI). The client workstation 220 is coupled to the network 130 through the network interface 232.

In an alternative implementation, client workstation 220 may only include a processor 224, a memory 226, a bus 228, and a network interface card 232. Accordingly, this "thin" client workstation may not have an I/O controller 230 connected to a mass storage 234. This is because all software components of the Unified Messaging System may be located on the server workstation 222.

The server workstation 222 also includes conventional components, such as a processor 234, a memory 236, a bus 238, an I/O controller 240, a network interface 242, and a mass storage 244. The bus 238 provides connectivity and communications among these components. Furthermore, the bus 238 uses a bus protocol, such as Industry Standard Architecture (ISA), Peripheral Component Interconnect (PCI), or Small Computer Systems Interconnect (SCSI). The server workstation 222 is coupled to the network 130 through the network interface 242. In this manner, the client workstation 220 may communicate with the server workstation 222 via the network 130.

Unified Messaging System and Method

Figure 3:
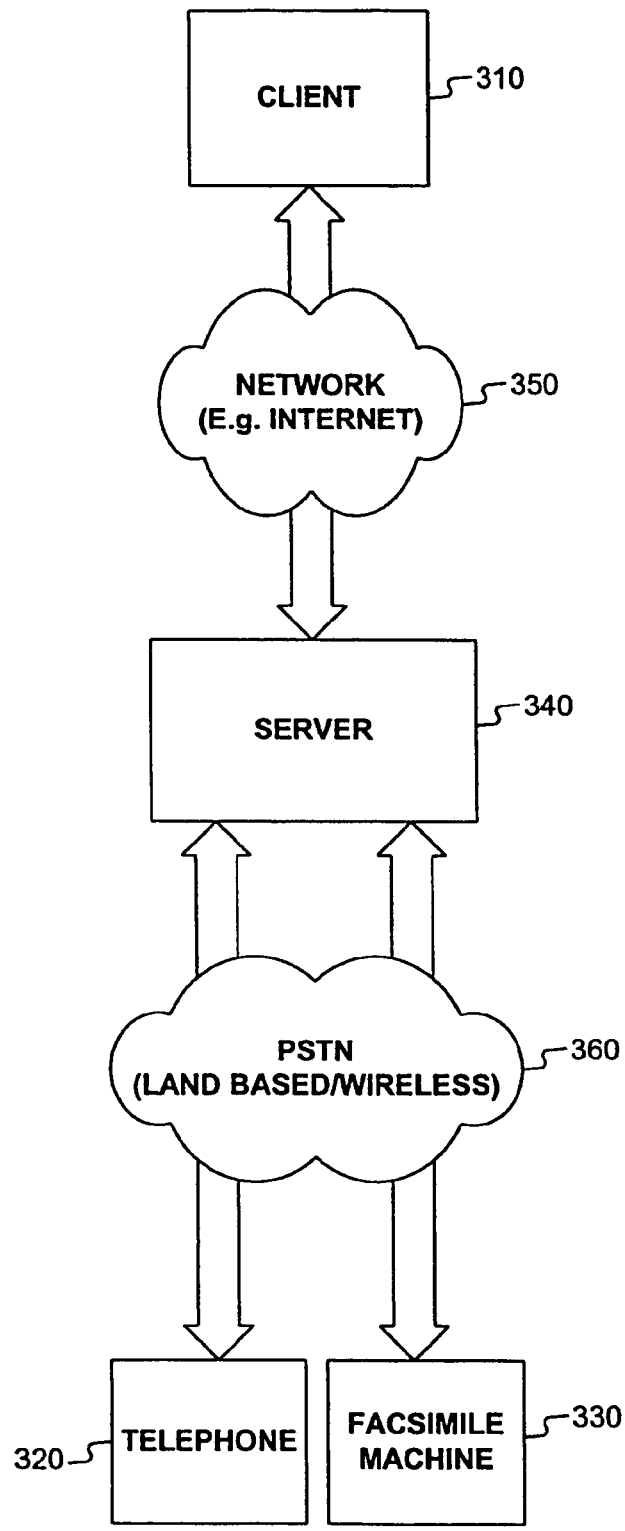
FIG. 3 is a block diagram of a unified messaging system connected through the information network such that multiple users may access the system in accordance with the present invention.

FIG. 3 illustrates a unified messaging system ("UMS") architecture in which systems and methods consistent with the present invention may be implemented. The UMS architecture consists of a client 310 and a UMS server 340 connected via a computer network 350, and a telephone 320 and a facsimile machine 330 connected to the UMS server via a Public Switched Telephone Network ("PSTN") 360. Client 310 may include any mechanism capable of communicating over network 350, including, for example, a personal computer, a personal digital assistant (PDA), or a thin client, such as a network computer. Accordingly, a user may access UMS server 340 using an Internet connection, such as a TCP/IP compliant application running on client 310, or a user may use an application that permits the user to dial into the server 340 using conventional telephone lines. FIG. 3 shows only one client, one telephone, and one facsimile machine connected to the server for simplicity. One skilled in the art would recognize that additional clients, telephones, and facsimile machines may connect to the server 340 in a number of different ways.

For example, a user may use telephone 320 to dial into UMS server 340 via PSTN 360 to leave a voice mail for another user. In addition, a user may retrieve email messages or facsimile messages using the client 310. Although FIG. 3 depicts client 310 connected to UMS server 340 via network 350, a client, such as a personal computer may connect to UMS server 340 via a land based or wireless connection through PSTN 360. Moreover, a user may access the messages stored on UMS server 340 using other devices also, such as cellular (analog or digital) telephones, and other wireless devices, including two-way paging devices.

UMS server 340 receives all types of messages, including voice mail messages, electronic mail messages, and facsimile messages, and stores these messages for later retrieval by users. Thus, a user may send a facsimile message to another user which will be stored on the UMS server 340 such that the other user may access the stored message using any of the clients connected to the UMS server 340. However, before a user can access a message stored on UMS server 340, the user must present identification information such that UMS server 340 can authenticate the user's identity and permit the user to view or manipulate messages addressed to that user.

Figure 4:
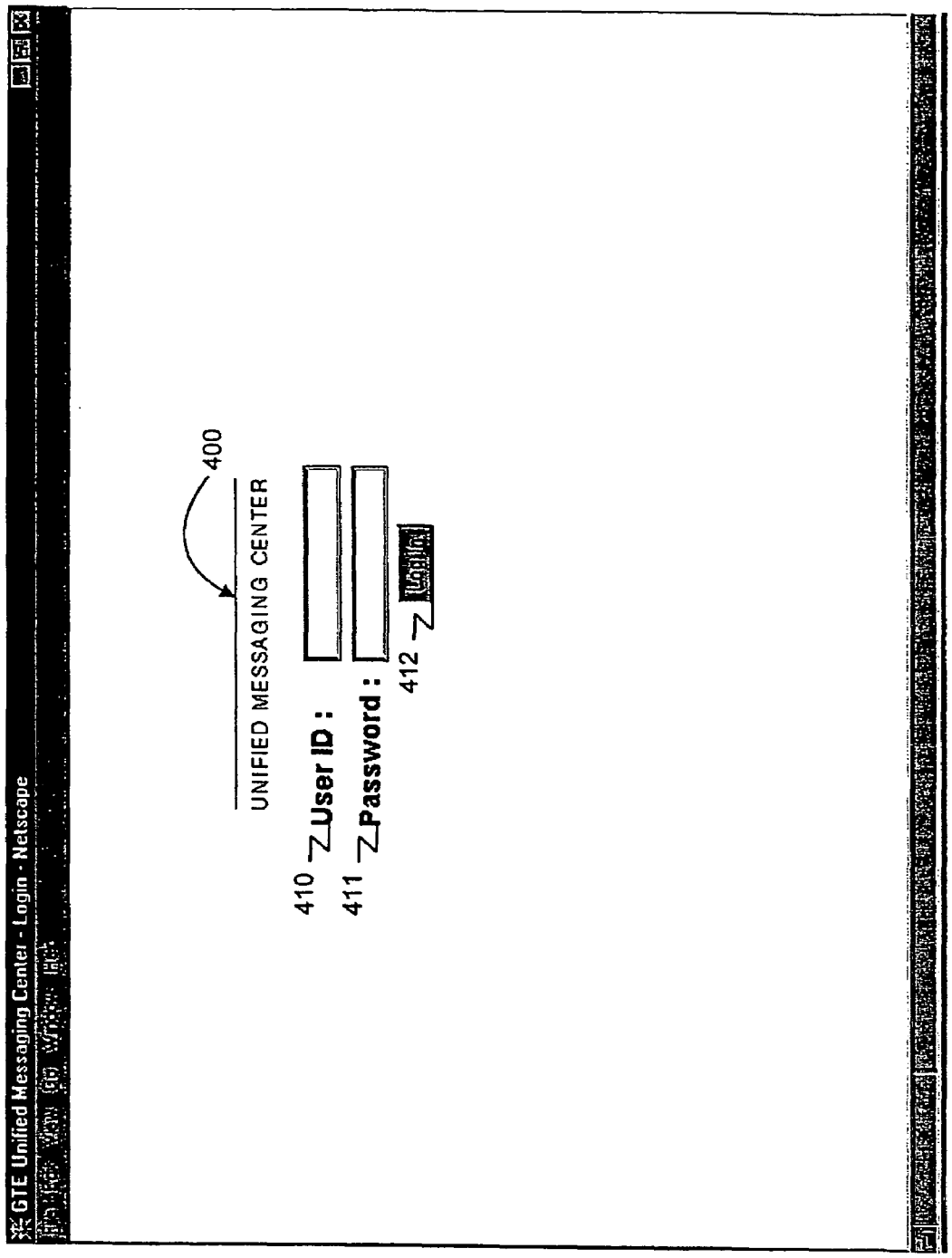
FIG. 4 is a pictorial diagram of a login screen that provides access to the unified messaging system to authorized users in a manner consistent with the present invention.

FIG. 4 is a diagram illustrating an exemplary access control screen 400 consistent with the present invention. Accordingly, a user must enter identifying information at a user ID 410 prompt. Different types of information may be used as identifying information, for example, a telephone number allocated to a user may serve as user identification. Alternatively, a UMS administrator may assign each user a distinct user name as identification, which may be a character string composed of letters from a user's name, such as a character string concatenating a user's first name and last name. For example, a user whose real name is Joe Bloggs may have Joe_Bloggs as his user name.

Having entered an identification at the User ID 410 prompt, a user may be required to enter a password at a Password 411 prompt. The password may be an alphanumeric string initially set to "password" by the administrator. This password may be changed by the user at a later time or the UMS administrator may set up the system such that password change is mandatory after first login or access to UMS server 340. Finally, a user may click on a button labeled login 412 to gain access to UMS server 340.

UMS server 340 then may authenticate or verify that the entered information matches one of the users' records, who is authorized to access the unified messaging system. If UMS server 340 finds such a match, then it may present the user with a view of the messages or message headers of the messages sent to that particular user. One skilled in the art would recognize that other methods for user authentication may be used, for example, finger prints or voice recognition systems may be used.

Figure 5:
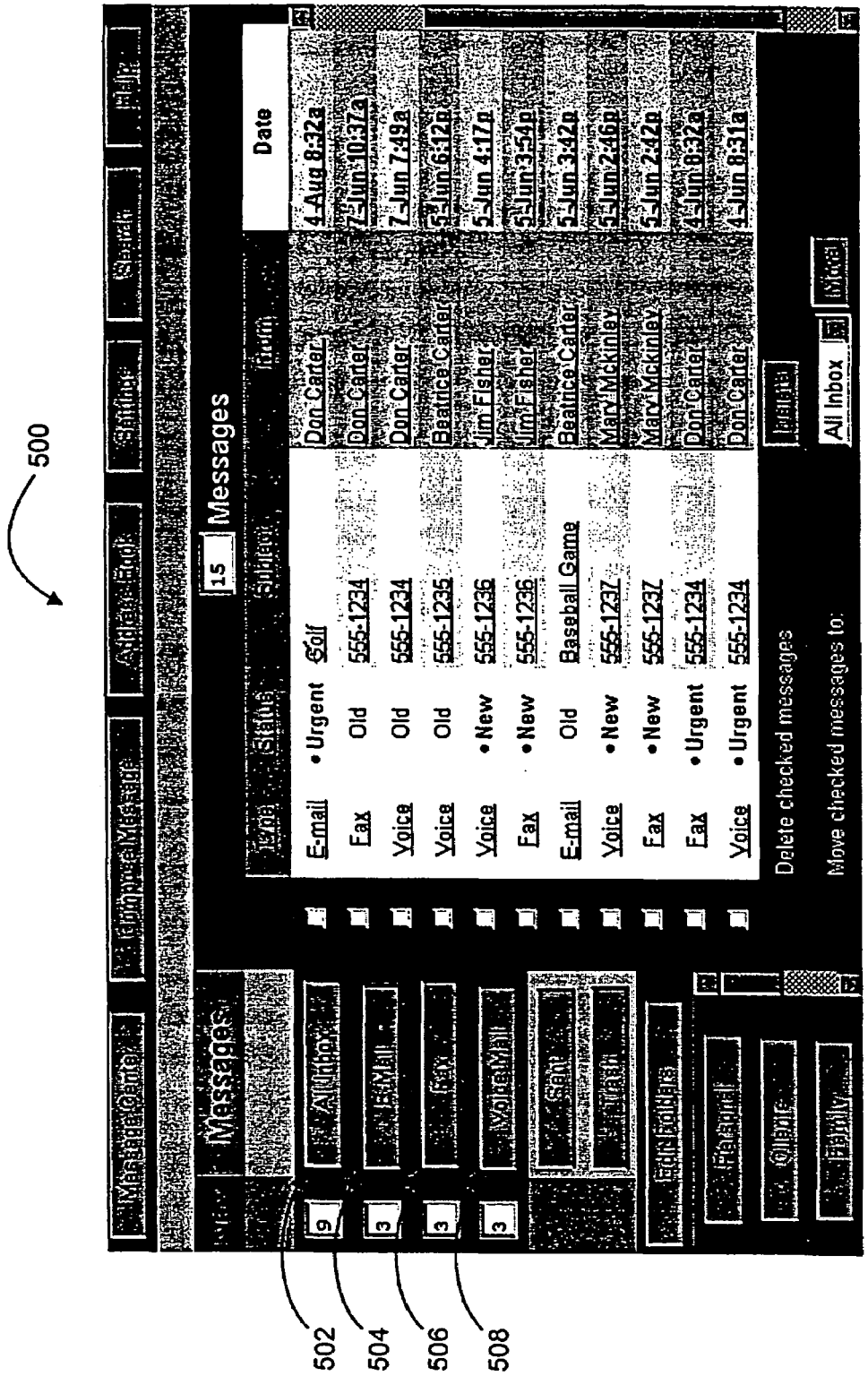
FIG. 5 is a pictorial diagram of a screen that a user is presented with once the user is granted access to the system in a manner consistent with the present invention.

FIG. 5 is a pictorial diagram of a view of a user-interface 500 that a user is presented with once that user is granted access to UMS server 340, consistent with the present invention. User-interface 500 displays messages of all types for a particular user chronologically, including information indicating the type, status, subject, sender's name, and date of the message for each message. A user may also control various settings associated with her mailbox using this interface. In addition, user-interface 500 has control buttons: All-inbox 502, E-Mail 504, Fax 506, and Voice Mail 508 that permit a user to display messages of all types or messages of only one type corresponding to the selected button.

Figure 6:
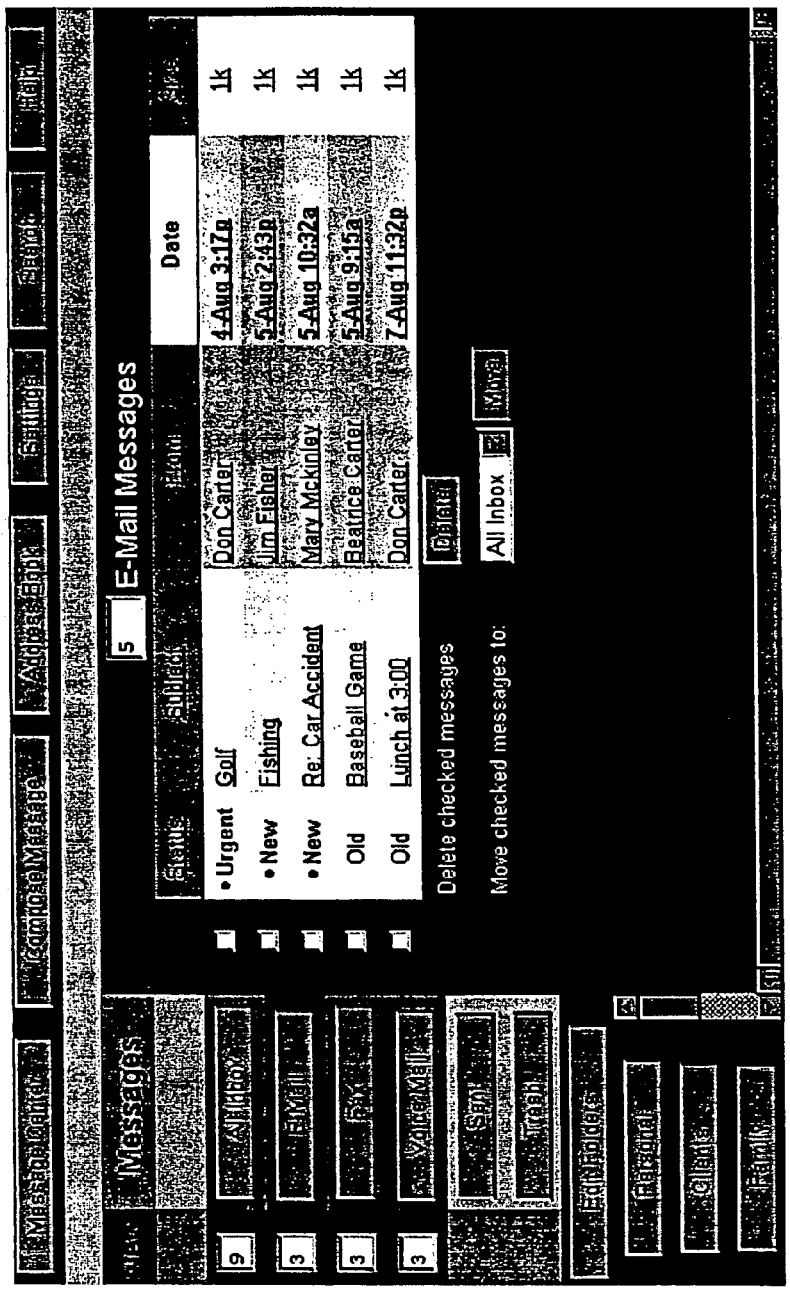
FIG. 6 is a pictorial diagram of the user interface of the unified messaging system in which electronic mail messages are displayed in a manner consistent with the present invention.
Figure 7:
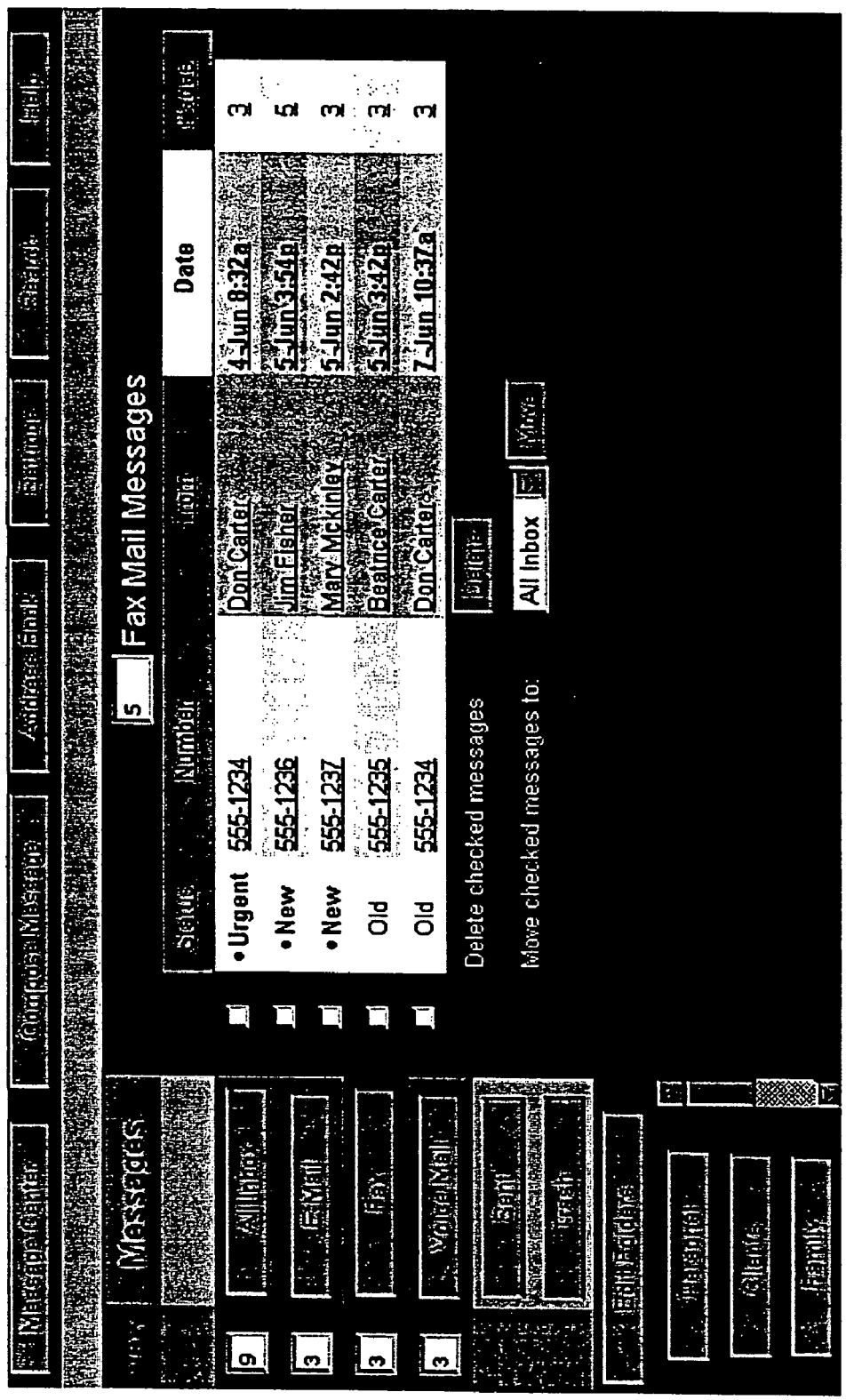
FIG. 7 is a pictorial diagram of the user interface of the unified messaging system in which facsimile messages are displayed in a manner consistent with the present invention.
Figure 8:
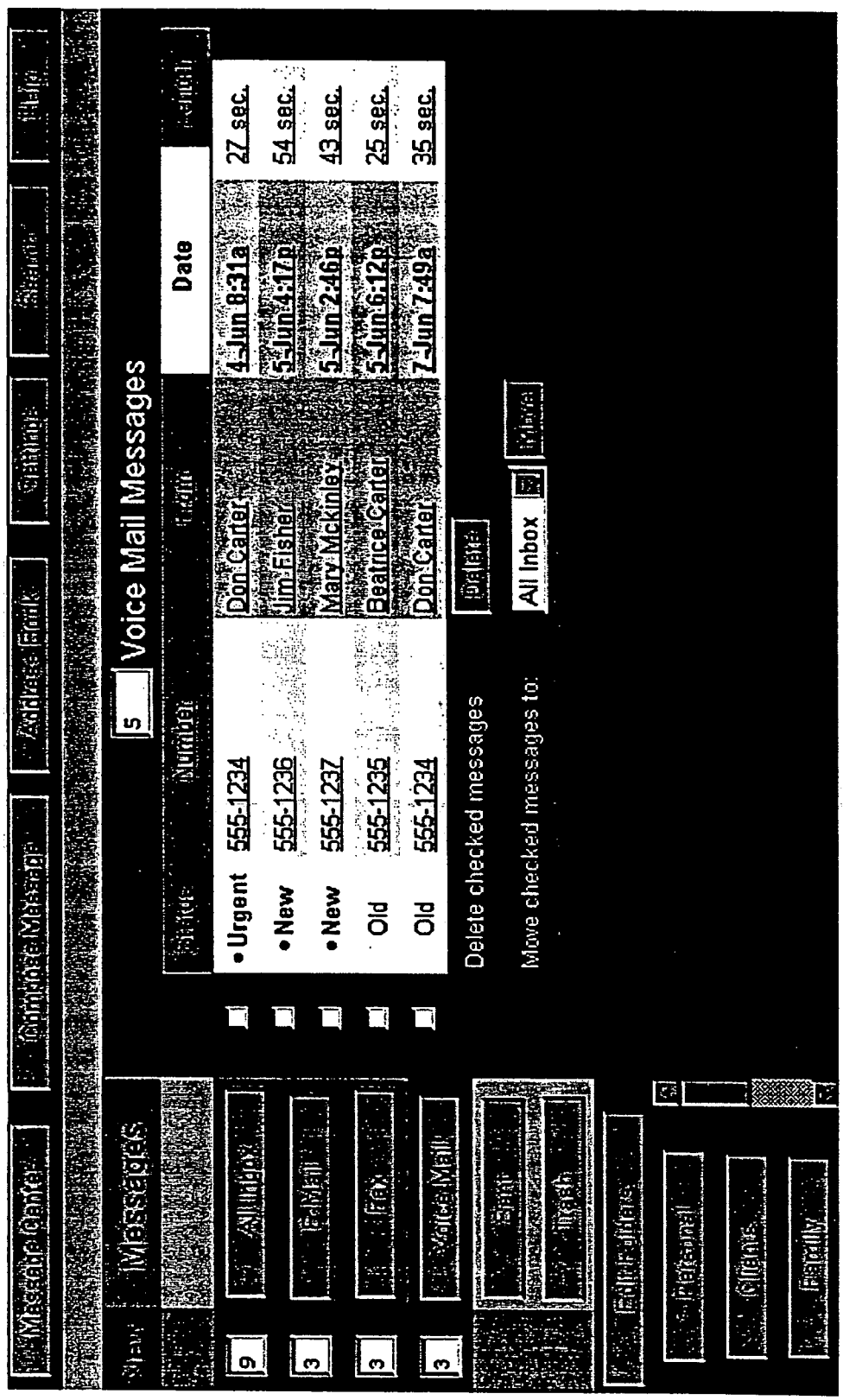
FIG. 8 is a pictorial diagram of the user interface of the unified messaging system in which voice mail messages are displayed in a manner consistent with the present invention.

Accordingly, when a user selects the E-Mail 504 button, for example, by clicking once this button with a mouse attached to a personal computer, user-interface 500 displays only the electronic mail messages listed, for example, chronologically as depicted in FIG. 6. When the user selects the Fax 506 button, user-interface 500 displays only the facsimile messages, which are once again listed chronologically as depicted in FIG. 7. When the user selects the Voice Mail 508 button, user-interface 500 displays only the voice mail messages, listed chronologically, as depicted in FIG. 8. Of course, the user may at any time select the All-inbox 502 button and revert back to a display where all messages are listed chronologically.

Figure 9:
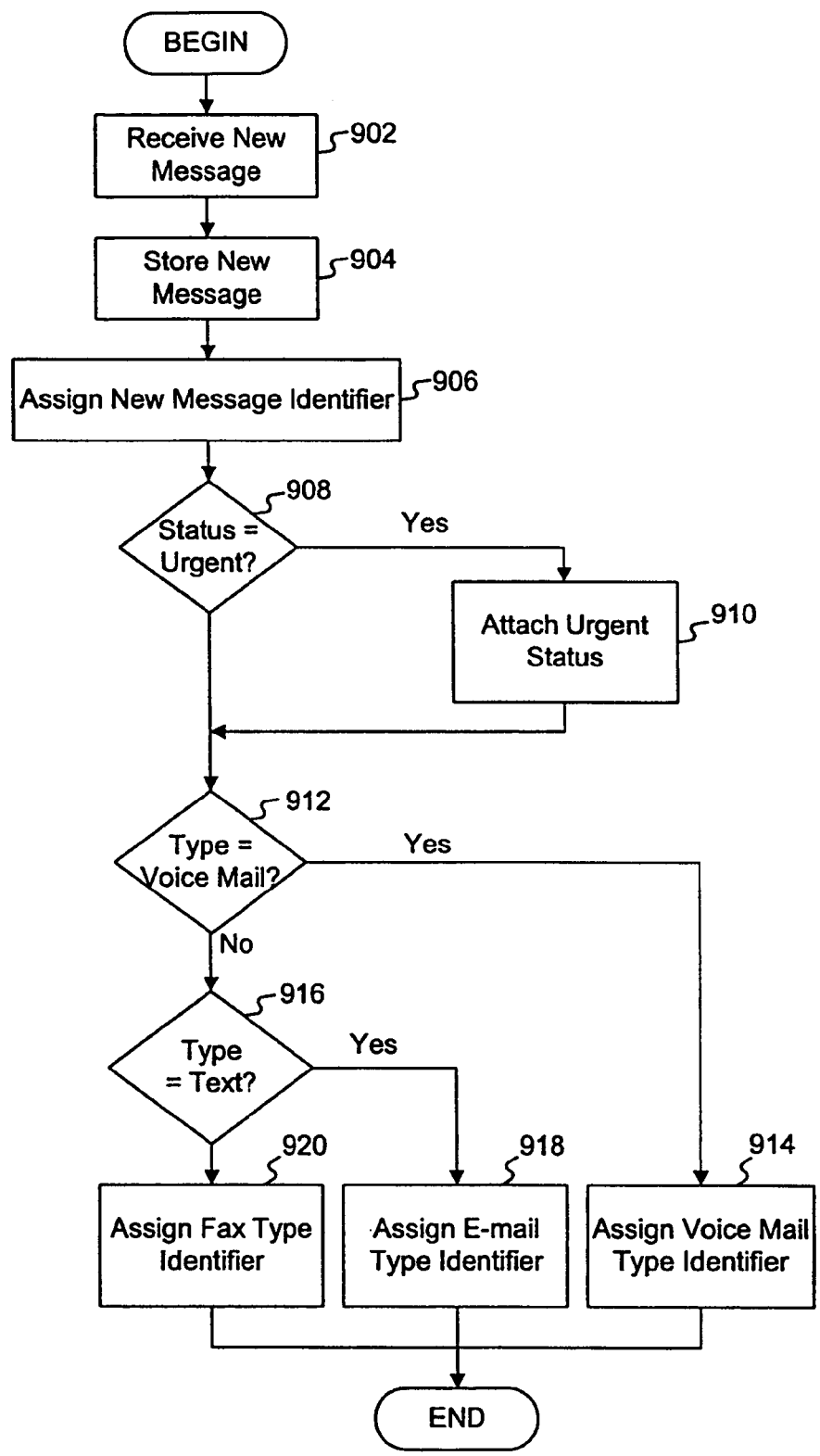
FIGS. 9 and 10 depict flow charts of the method steps for providing unified messaging in a manner consistent with the present invention.
Figure 10:
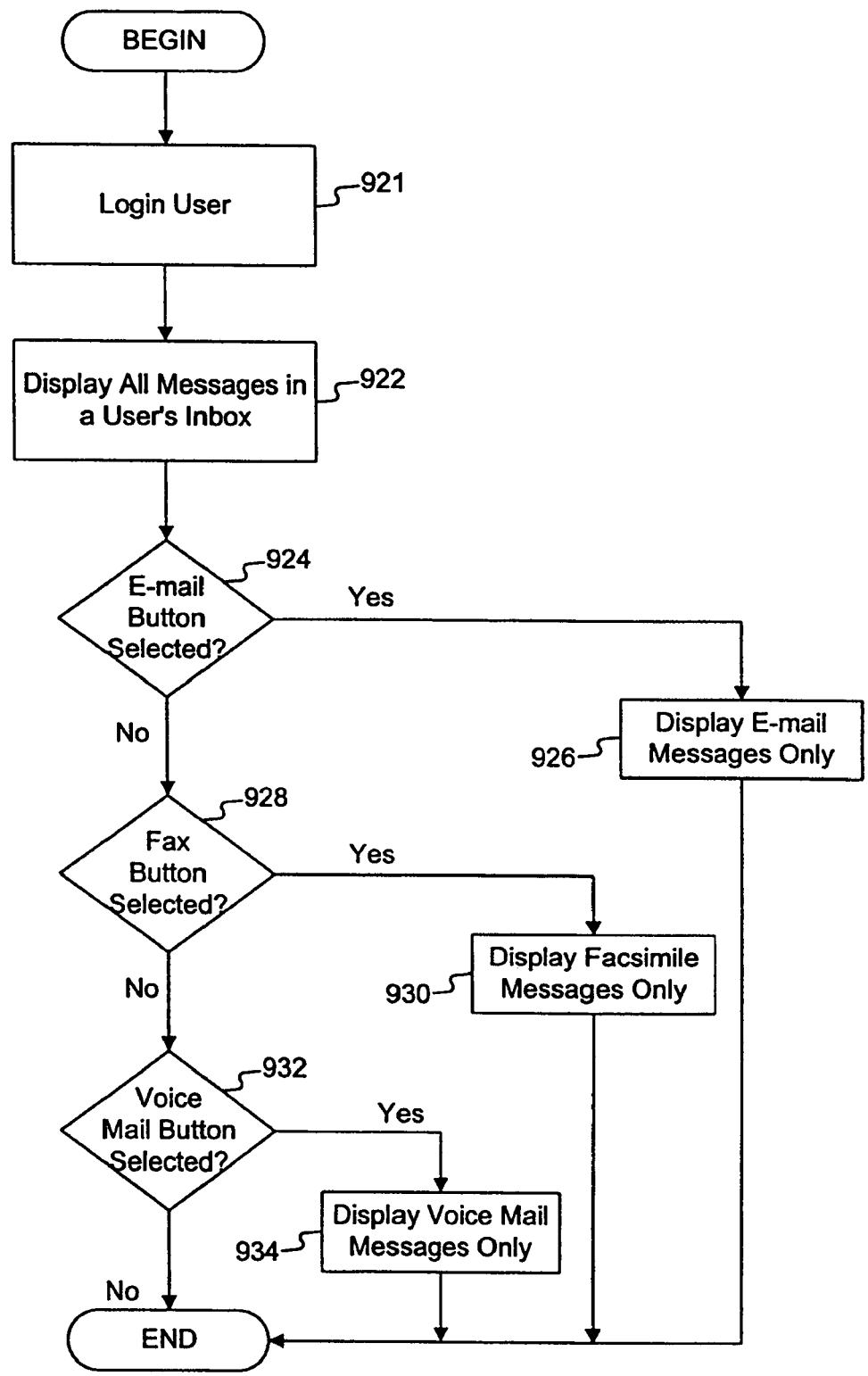

FIGS. 9 and 10 depict the steps performed by UMS server 340 when it receives a message for a user and displays the message in accordance with user input. Although the steps of the flow chart are described in a particular order, one skilled in the art will appreciate that these steps may be performed in a different order. The first step performed is that UMS server 340 receives a new message (step 902). Upon receiving a new message the UMS server stores the new message for retrieval by another user(s) who may be the designated recipients of this message (step 904). Next, UMS server 340 assigns a new message identifier to the new message (step 906). Of course, this message may be of any type. Then, UMS server 340 determines whether the sender of the message has designated the message as an urgent message (step 908). If the sender of the message has designated the message to be an urgent message then UMS server 340 attaches an urgent status indicator to the message (step 910).

Subsequently, in step 912, UMS server 340 determines whether the message is a voice mail message. If the message is a voice mail message, then UMS server 340 assigns the new message a voice mail type identifier (step 914). Next, UMS server asks whether the message is a text message, or in other words whether the message is an electronic mail message (step 916). If the message is an electronic mail message, UMS server 340 assigns the new message an E-mail type identifier (step 918). In the next step, UMS server 340 assigns the new message a facsimile type identifier because the message is found to be neither of a voice mail type of message nor an electronic mail type of message (step 920). Although the steps of the flow chart depict processing of three message types, one skilled in the art will appreciate that the systems and methods consistent with the present invention may be used to process additional message types. For example, another message type could be a page from a paging device.

In addition, the systems and methods consistent with the present invention may be used to segregate messages as a function of the destination of the message. Specifically, UMS server 340 stores input messages where each message has an associated identifier indicating each message's destination. Upon receiving an input signal from a user, UMS server 340 may display messages for a particular destination only. For example, UMS server 340 may attach a different identifier to each message indicating whether the message is destined for a user's home or a user's office. The user may then select an icon on the user interface associated with the UMS server 340 to view only those messages that were addressed to her office. Similarly, the user may select another icon to view only those messages that were addressed to her home. Although, the present invention describes use of two icons to switch from a view that displays messages destined for a user's office to a view that displays messages destined for a user's home, one skilled in the art would understand that a single toggle switch or a single icon may also be used.

Referring now to FIG. 10, when a user accesses UMS server 340, the user is logged in based after matching user's user-name and password information (step 921). After the user is logged in UMS server 340 displays all messages intended for that user, as a default view for that particular user (step 922). UMS server 340 then determines whether the user has selected the E-Mail 504 button (step 924). If the user has selected the E-Mail button then UMS server 340 displays E-Mail messages only (step 926), as shown in FIG. 6. If the user has not selected the E-Mail button, then UMS server 340 determines whether the user has selected the Fax 506 button (step 928). If yes, then UMS server 340 displays facsimile messages only (step 930), as depicted in FIG. 7. If the user has not selected the Fax button, then UMS server 340 determines whether the user has selected the Voice Mail 508 button (step 932). If yes, then UMS server 340 displays the voice mail messages only (step 934), as depicted in FIG. 8. Of course, one skilled in the art would recognize that UMS server 340 continuously monitors and responds to the activity of a user, such that whenever a user selects any one of the buttons the UMS server switches the display in accordance with that button selection.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. In addition, one skilled in the art would recognize that the UMS server may store messages of other types, including video or multimedia messages, pages from paging devices, and distinguish these message types using additional message identifiers, and segregate messages by type. Although aspects of the present invention are described as being stored in memory, one skilled in the art will appreciate that these aspects may also be stored on or read from other computer-readable media, such as secondary storage devices, like hard disks, floppy disks, or CD-Rom; a carrier wave from the Internet; or other forms of RAM or ROM. The scope of the invention is defined by the claims and their equivalents.

What is claimed is:

1. A method for providing unified messaging, comprising:
storing a plurality of input messages directed to a user, each input message being of a particular type selected from a group consisting of a voice message, a text message, and an image, wherein the input messages further identify different user destinations;
determining the type of each input message;
assigning an identifier for each input message based on the determined message type;
displaying a view of the input messages, the view including information identifying and the assigned identifier for each input message;
providing in the displayed view at least one icon associated with one of the input message types that, when selected, eliminates from the view all of the input messages except those associated with the input message type of the icon;
receiving a signal indicating a selection to view messages identifying a particular user destination; and
modifying the view of the input messages based on the received signal.

2. A method for providing unified messaging, comprising:
storing a plurality of input messages directed to a user, each input message being of a particular type selected from a group consisting of a voice message, a text message, and an image, wherein the input messages further identify different user destinations;
displaying a view of at least a subset of the input messages, the view including, for each input message, information identifying the message and a corresponding identifier determined based on the type of the message;
receiving a signal indicating a selection to view only messages of a particular type;
modifying the view of the subset of the input messages based on the received signal;
receiving a signal indicating a selection to view messages identifying a particular user destination; and
modifying the view of the subset of the input messages based on the received signal.

3. A method for providing unified messaging, comprising:
storing a plurality of input messages directed to a user, each input message being of a particular type selected from a group consisting of a voice message, a text message, and an image, wherein the input messages further identify different user destinations;
determining the type of each input message;
assigning an identifier for each input message based on the determined message type;
displaying a view of the input messages, the view including, for each input message, information identifying and the assigned identifier for the input message;
providing in the displayed view a plurality of icons, each icon associated with one of the types of input messages;
inputting a signal indicating selection of one of the icons;
modifying the view of the input messages such that only the identifying information for each input message of a particular type based on the inputted signal is included in the view;
receiving a signal indicating a selection to view messages identifying a particular user destination; and
modifying the view of the input messages based on the received signal.

4. A method for providing unified messaging, comprising:
storing a plurality of input messages directed to a user, each input message being of a particular type selected from a group consisting of a voice message, a text message, and an image, wherein the input messages further identify different user destinations;

determining the type of each input message;

assigning an identifier for each input message based on the determined message type;

identifying a set of the input messages that indicate receipt within a predetermined period of time;

displaying a view of the set of the input messages, the view including information identifying and the assigned identifier for each input message in the set, segregated by type;

providing in the displayed view at least one icon associated with one of the input message types that, when selected, eliminates from the view all of the input messages except those associated with the input message type of the icon;

receiving a signal indicating a selection to view messages identifying a particular user destination; and modifying the view of the set of the input messages based on the received signal.

5. A method for providing unified messaging comprising the steps, performed by a processor, of;

storing a plurality of input messages directed to a user, each identifying one of at least two different user destinations, the at least two different user destinations including the user's office and the user's home;

displaying a view of at least a subset of the input messages, the view including, for each input message, information identifying the message;

receiving a signal indicating a selection to view messages identifying a particular destination of the at least two different user destinations; and modifying the view of the subset of the input messages based on the received signal.

* * * * *